Nov. 14, 1950     I. I. SIKORSKY ET AL     2,529,635
HELICOPTER ROTOR CONTROL MECHANISM
Filed Oct. 31, 1945     4 Sheets-Sheet 1

I. I. SIKORSKY
WILLIAM E. HUNT
E. F. KATZENBERGER
INVENTORS

BY *Gifford S. Holmes*
AGENT

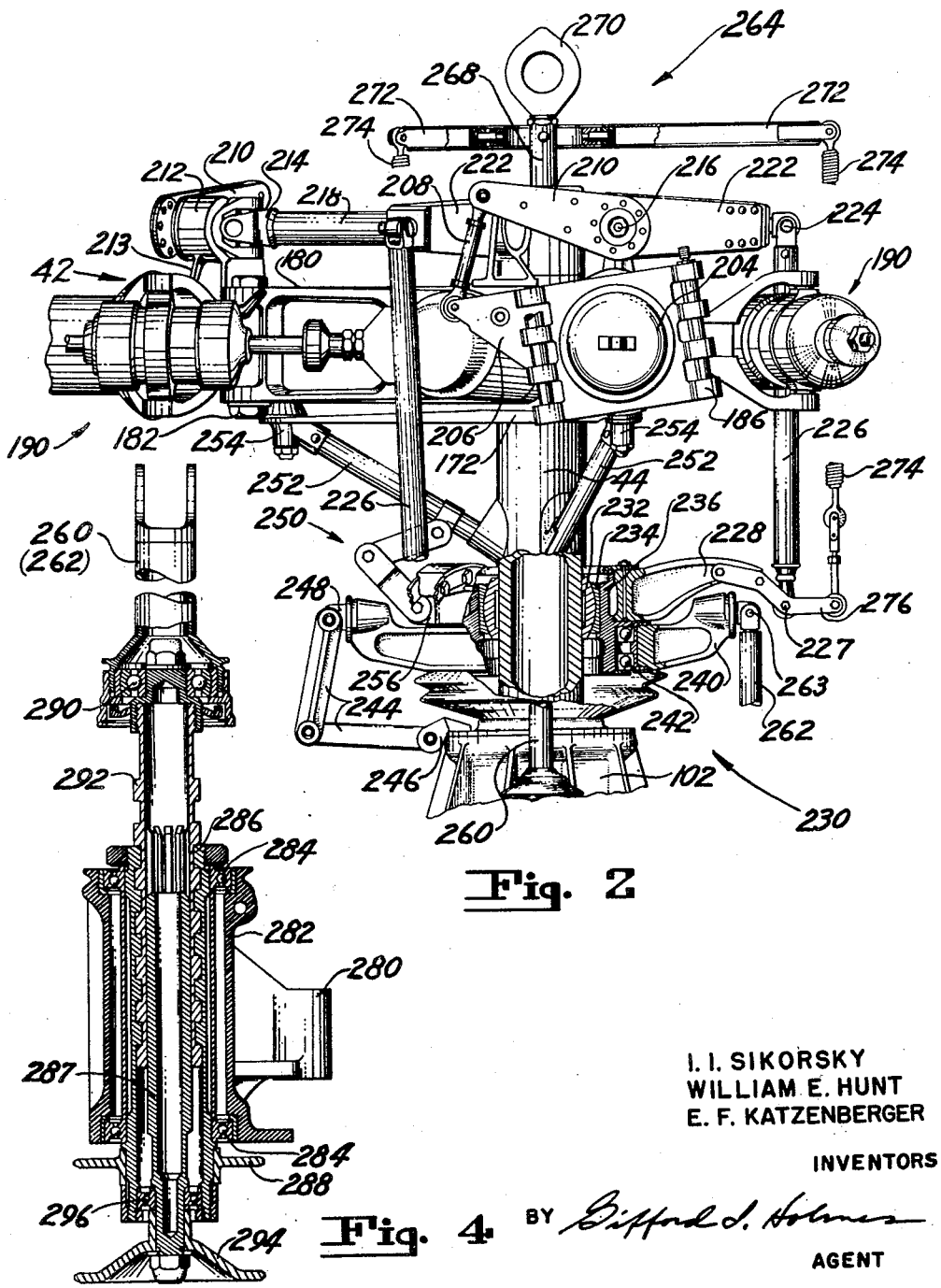

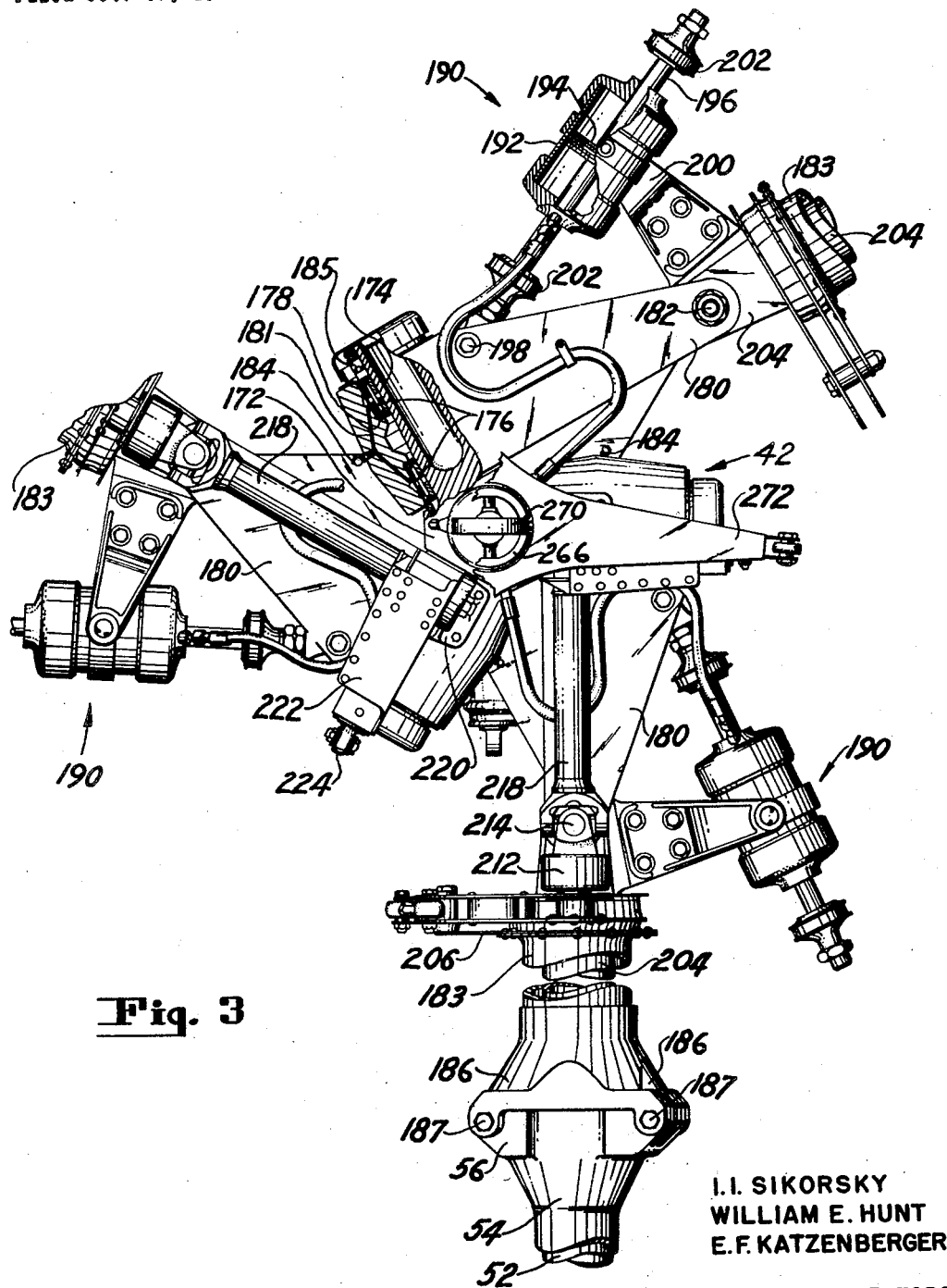

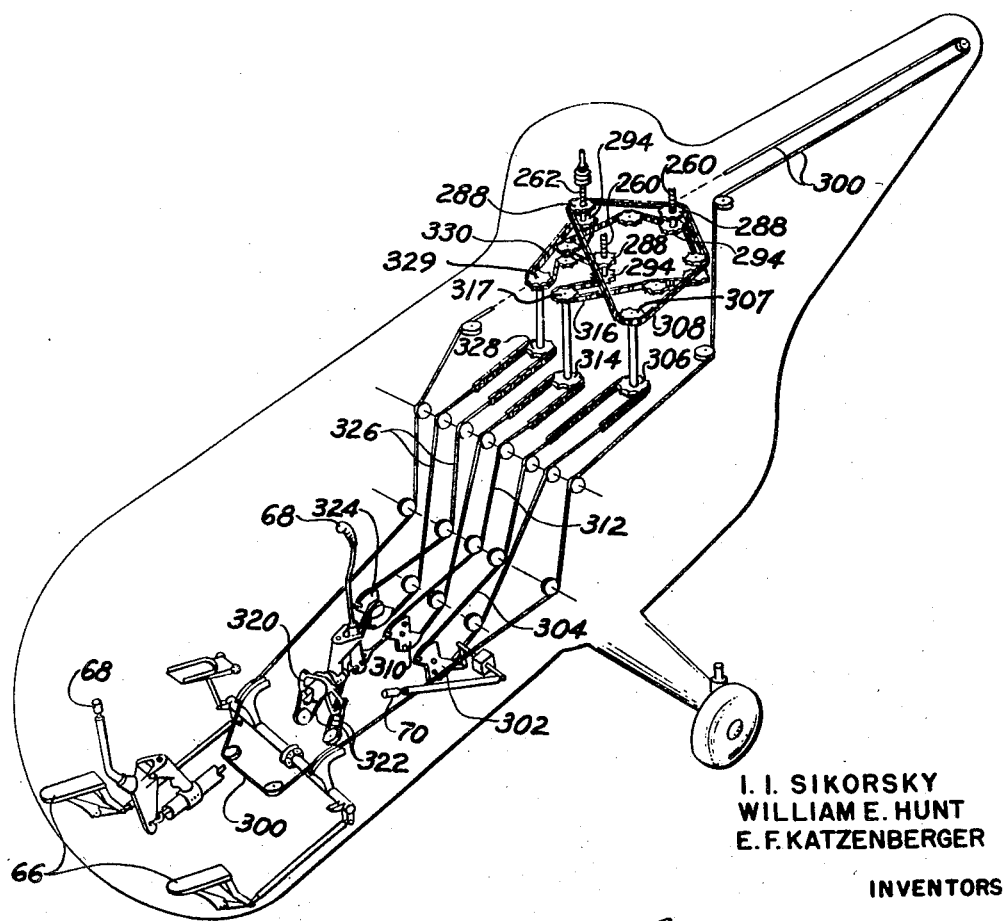

Patented Nov. 14, 1950

2,529,635

UNITED STATES PATENT OFFICE 2,529,635

HELICOPTER ROTOR CONTROL MECHANISM

Igor I. Sikorsky, Bridgeport, William E. Hunt, Brooklyn, and Edward F. Katzenberger, Bridgeport, Conn., assignors to United Aircraft Corporation, East Hartford, Conn., a corporation of Delaware Application October 31, 1945, Serial No. 625,794

6 Claims. (Cl. 170—160.25)

1

This invention relates to that type of aircraft known as helicopters which obtain their lift directly through rotors, and more particularly to an improved structure and arrangement of rotor controls therefor.

The general structure and mode of operation is similar to those craft shown and described in the co-pending applications of I. I. Sikorsky, U. S. Appl. Ser. No. 592,862, filed May 9, 1945, and of R. P. Alex and M. D. Buivid, U. S. Appl. Ser. No. 599,920, filed June 16, 1945, the former having issued as Patent No. 2,517,509 Aug. 1, 1950.

The rotor and the pylon portion of the rotor controls of this invention comprise, severally, a three-bladed rotor mounted upon a compact and rugged driving spider; and controls including a simplified linkage of high capacity with low weight having an improved jack-screw type of actuator for controlling and coordinating the cyclic and collective pitch functions.

It is an object of the invention to provide improved rotor control means having automatic compensating provisions for cyclic pitch with respect to collective pitch changing movement, and vice versa.

Another object is to provide compensating means for total pitch reducing moments which are inherent in some blade structures.

These and other objects will be either obvious or pointed out in the following specification and claims.

In the drawings:

Fig. 2 is an elevational view of the rotor head with parts broken away, parts in section and parts omitted to clearly show the operating parts and principles of this invention;

Fig. 3 is a plan view of the rotor head with parts broken away to show the details of construction thereof;

Fig. 4 is a detail sectional view of the portion of the jack-screw and jack-shaft combination cooperable with the controls of the rotor head and with the manual control means in the cabin of the helicopter; and Fig. 5 is a diagrammatic view of the manual control means and the jack-screw operating means associated therewith and with the control mechanism shown in Figs. 2, 3 and 4.

Figure 1:
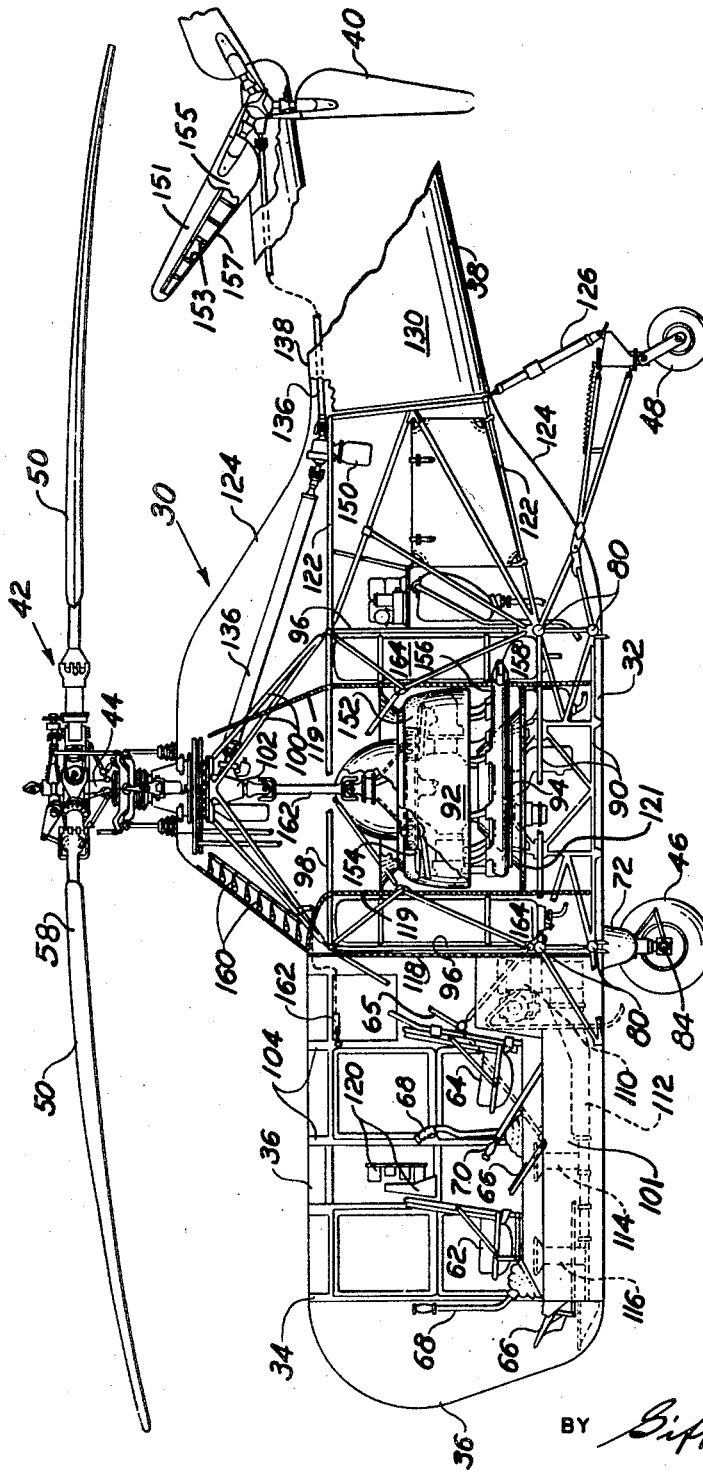
Fig. 1 is an inboard profile longitudinal section with parts in elevation, with parts broken away and parts omitted to show the interior arrangement of operating parts of the helicopter and the association thereof with the rotor head and the torque compensation rotor.

In the description of the helicopter to follow, certain dimensions and capacities of component parts will be used to explain the presently preferred embodiments involving a given capacity; but it is to be understood that changes and equivalent structures known to one skilled in the art are also contemplated and the proportions used are only by way of example and are not to be construed in a limiting sense.

Referring now in detail to the drawings:

In Fig. 1, a presently preferred modification of the improved helicopter is shown in side view. The helicopter comprises a body generally indicated by the reference character 30 made up of a central portion 32 containing the engine and appurtenances thereto to be described below, a forward portion 34 which is made up in large part of transparent material 36 to provide a large field of vision substantially in excess of 180° for the occupants thereof, and a tail portion 38 mounting a torque compensation rotor 40 at its extremity. As best shown in Fig. 2, a sustaining rotor generally indicated by the character 42 is mounted above the central portion 32 of the helicopter upon a drive shaft 44, and the hub thereof may have its operating parts covered by a streamlined protecting bonnet.

Landing gear wheels 46 are spaced at the sides of the forward part of the central portion 32 and a third wheel 48 is mounted on the rear portion thereof.

Rotor blades 50 of the rotor 42 have a length of substantially 24 feet measured from the shaft 44 and each has an area of substantially 38⅓ square feet, there being three to make a total of substantially 115 square feet. The blade is built upon a steel spar 52 (Fig. 3) that is secured in a root cuff 54 provided with a pair of sets of perforated ears 56 for mounting the same to a stub spar on the rotor to be described hereinafter. At the root end 58 of the blade, the airfoil section is substantially that known as NACA 0012–64 and the blade tapers to substantially NACA section 0009–64 at the root, the taper beginning at approximately 60 per cent of the radius of the airfoil portion of the blade. The cord at the root 58 is substantially two feet and the tip cord is substantially one foot.

The weight of the helicopter constructed in accordance with this invention is approximately 3725 pounds and the useful load is substantially 1100 pounds, thus giving a gross weight of substantially 4825 pounds. With the area of the rotor blades set forth above of 115 square feet, the blade loading for such weight is approximately 42 pounds per square foot of blade, and the swept disc area being substantially 1810 square feet gives a disc loading of approximately 2.7 pounds per square foot. The engine for turning the rotor 42 and the torque compensating rotor 40 is a radial "Pratt and Whitney Wasp Junior" engine of approximately 450 horsepower at sea level. The mounting and connections of the engine with the parts operated thereby will be described more fully below.

Fig. 1 shows the seating and control arrangement of the helicopter which has been designed primarily for observation purposes. The forward portion 34 contains an observer's seat 62 at the front and a pilot's seat 64 at the rear. Each of the seats has control pedals 66 arranged for convenient operation by an occupant of the seat, a control stick 68 for controlling the directional attitude of the helicopter and a total pitch control arm 70, the operation of which will be described below in connection with the control of the craft. The tandem arrangement of the controls is most advantageous for observation type craft, but it is to be understood that the controls may be substantially identical but arranged for side-by-side seating arrangement in the same manner as in the abovementioned applications.

In Fig. 1, the landing gear including the front wheels of the helicopter is shown. The landing gear is made up of external cones 72 each of which has internal tension and compression rods, not shown, secured to structural members 80 of the foundation truss of the central portion of the helicopter. The cones 72 are provided with shock struts at their ends which may be of conventional air-oil type and which carry at their lower ends axles 84 for mounting the wheels 46. Such structure provides a light weight and relatively low drag assembly and sufficient damping to prevent ground resonance or instability upon contacting the ground because the shock struts are extended due to gravity when the helicopter is off the ground to provide a cushioned landing.

In Fig. 1, the helicopter is shown in substantially longitudinal elevational section with certain parts broken away and certain parts left out for the purpose of clarity. The central portion 32 comprises lateral main framing members 80 and longitudinal main framing members 90 secured together by angle trusses to make up a very light weight but sturdy base supporting an engine 92 upon a mount 94 secured to the frame members 90. Vertical framing members 96 are secured to the base members and tied together by upper struts 98 and lateral ties, not shown, and support radially converging members 100 supporting the gear box 102 and thereby the rotor shaft 44.

The forward portion 34 of the helicopter is built of sheet metal parts forming a cantilever base structure 101 supporting framing members 104 for suporting doors and the transparent material such as "plexiglas" 36 completing the forward portion 34. The forward portion 34 is suitably secured to the front of the central portion and may be removable bodily therefrom so that the forward portion 34 may be replaced. The base structure 101 encloses the control connections to the control members 66, 68 and 70, supports the seat 62, and houses a heating system comprising a fuel burning heater 110 which supplies warm air through a main duct 112 to outlets 114 and 116 to the interior of the forward portion 34.

The seat 64 is supported by framing members 65. Instruments 120 are mounted adjacent a side wall of the forward portion 34 in view of the occupant of the pilot's seat. Fire walls 119 separate the fuel tanks from the engine and, with the side walls, also provide a passage for the engine coolant air. A partition 121 closes off the bottom of this passage so that the air may pass out of openings at the sides of the craft. A fire wall 118, preferably made of stainless steel, or the like, separates the forward portion 34 from the central portion 32 so that in the event of fire in the central portion the forward occupant's portion will be removed from immediate danger, and also provides an insulating wall between the forward and central portions for blocking excessive heat transfer tendencies between such portions.

The tail portion 38 is secured to the central portion 32 by trusses 122, and covering 124 of the central portion is faired into the tail portion to provide a streamlined structure. A shock strut 126 is mounted between the tail portion and the tail wheel 48. The tail portion 38 extends rearwardly to an extent sufficient to mount the tail rotor 40 outside of the disc swept by the main rotor 32. The tail portion 38 is built as a substantially round sectioned cone tapering towards the rear. The tail portion is of semi-monocoque construction comprising a stressed skin 130 supported radially by suitably spaced rings which may be joined by longitudinal stringers. A tail rotor drive shaft 136 is housed within a substantially semi-circular longitudinally extending cover 138 provided with bearings secured in rubber or other resilient damping material and held in place by brackets secured through the skin 130 to the rings. The drive shaft 136 is driven by suitable gearing in the gear box 102 from the engine 92 and turns a generator 150 for supplying electrical power for users thereof in the helicopter. The tail rotor 40 for compensating torque is of the variable pitch type, the pitch being controlled by the pedals 66 in the cockpit to change the thrust of the rotor 40. The pitch change mechanism may be of any known type but is preferably of that type shown in the patent to I. I. Sikorsky, No. 2,318,259, except that the pitch is changed by a jack-screw rather than by a bell crank and the control cables rotate a drum to turn the screw.

The construction of the blades of the tail rotor 40 comprising a spar 151 built of laminated plywood supporting solid ribs 153 that support a plywood cover 155, which cover is also secured to the spar 151. A trailing edge tie strip 157 is secured to the cover 155, the ribs 153 and to the spar 151 at its end. The spar 151 is bolted to a pivot support bracket. Such blade construction is easily fabricated, of light weight, and has good aerodynamic characteristics.

The engine 92 is surrounded by a cowling 152 which directs air from the passage named above through the fan part of a combined centrifugal clutch and fan 154 down past the engine cylinders and out of suitable side outlets in part, and in part through a duct 156 surrounding an exhaust stack 158 from the engine 92. The air, thus, cools the engine and the exhaust gases to prevent overheating of the engine and to increase the efficiency of the engine by cooling exhaust gases and thus reducing exhaust back pressure operative against the pistons within the cylinders. The cooling air is introduced into the passage formed in the central portion 32 through the pylon at the forward part thereof wherein adjustable shutters 160 are mounted and controlled by thermostatic means, not shown, adjacent the engine; or by a manual control arm and linkage shown diagrammatically at 162. The control construction may be of any conventional type and the details thereof form no particular part of this invention.

The engine 92 turns a drive shaft 162 which turns a high speed gear of the gearing within the gear box 102 to turn the tail rotor drive shaft 136 and the main rotor drive shaft 44 to which the main rotor blades 50 are attached by the hub. A free wheel, or overrunning clutch may be within the housing so that the main rotor may autorotate and turn the tail rotor.

The engine 92 is supplied with fuel from a pair of fuel tanks 164 mounted in the center portion 32 of the helicopter and supported by members 96. The tanks 164 are mounted fore and aft of the engine 92 and the center of gravity of the helicopter is controlled by selectively drawing off fuel from one or the other of the tanks to reduce the weight of fuel therein to shift the center of gravity away from the tank from which fuel is being withdrawn.

In Figs. 2 and 3, the connection of the blade spars 54 with the drive shaft 44, and the control connections to the rotor head are shown. The drive shaft 44 extends upwardly from the upper part of the gear box 102 in which it is mounted on a thrust bearing, not shown, to assume lift loads and on a radial bearing to assume horizontal loads and is secured to a spider 172 which includes radially extending spindles 174 having substantially horizontal axes spaced 120 degrees from each other to accommodate the mountings for three rotor blades. Each spindle 174 is adapted to receive needle bearings 176 which mate with internal shoulders 178 of a flapping link 180. Passages 181 supply lubricant to the needle bearings 176 and a grease fitting 184 is provided for filling the bearings. The flapping link 180 is secured on the spindle 174 by a lock nut and thrust bearing assembly 185. Each flapping link 180 has a vertical hinge 182 at its outermost end which mounts a journal 204 which in turn mounts a stub spar 183 that is provided at its end with perforated ears 186 that mate with ears 56 on the cuff 54 containing the blade spar 52 and receive a pair of taper pins 187 for securing the two together. With such arrangement of the flapping link 180, the blades connected thereto can flap upwardly around the spindles 174 on the spider 172 and rotate backward and forward around the vertical hinge 182 to relieve stresses during flight. This latter action is restrained by dampers 190, each comprising a cylinder 192 containing a piston 194 carried upon a piston rod 196 which is pivoted at one of its ends on a pin 198 in the flapping link 180 (Fig. 3). A yoke 200 is secured to the cylinder 192 and to the journal 204 so that the cylinder is constrained to move with the stub spar 183 as it, in turn, moves with the blade to which it is attached. The cylinder 192 and piston 194 can move with respect to each other, and the liquid contained within the damper 190 will have to pass from one chamber to another through a suitable restriction, not shown, to damp such action. The limits of movement of the damper is determined by resilient stops 202 mounted upon the piston rod 196. For further details of the damper, reference may be had to the co-pending application of M. D. Buivid, Ser. No. 618,560, filed September 22, 1945.

The rotor blades 50 of this helicopter are mounted for pitch change upon the journal 204 within the stub spar 183, which two are secured together by anti-friction thrust bearings, not shown, capable of absorbing the centrifugal loading of a blade 50 when in operation. The stub spar, the spar 52 solidly connected therewith by the cuff 54, and the connecting ears 56 and 186 are rotatable together upon the journal 204 and are turned by a rocker arm 206 secured to the stub spar 183. The rocker arm 206 extends towards the trailing edge of the blade 50 and is connected by a push-pull link 208 (Fig. 2) by pivots to a crank 210 mounted in a bearing 212 (Fig. 3) carried upon a bracket 213 (Fig. 2) atop the flapping link 180 for pivotal movement upon a crank shaft 216. A universal joint 214 connects the crank shaft 216 with a rocker shaft 218. The universal joint 214 has its center in vertical alignment with the drag hinge or pivot 182 so that fore and aft movements of the blade 50 will not change the pitch setting of the blade. The rocker shaft 218 has its other end pivotally mounted in a bracket 220 supported atop the flapping link 180 at its inner end. A crank arm 222 extends laterally of the link 180 and is non-rotatably secured at its inner end to the rocker shaft 218. The outermost end of the arm 222 extends beyond the spindle cap and is provided with a universal pivot 224 connecting the arm 222 with a substantially vertical push-pull rod 226, which, at its lower end, is universally pivoted at 227 to an arm 228 of a control mechanism generally indicated by the reference character 230. As the rod 226 is raised by mechanism 230, the crank arm 222 will be raised to turn the rocker shaft 218 and the crank shaft 216 to lower the crank 210 and the pitch change arm 206 to increase the pitch of the rotor blade attached thereto. When the rod 226 is lowered, the opposite action occurs and the pitch of the rotor blade will be decreased.

The pitch control mechanism 230 is mounted upon the drive shaft by a vertically slidable spherical bearing segment 232. A bearing 234 having a mating internal spherical surface is secured within a sleeve 236, which has secured to it the arms 228 for controlling the pitch of the rotor blades 50 as described above. A control plate 240 is rotatably secured by anti-friction bearings 242 to the sleeve 236. The plate 240 is maintained non-rotatable with respect to the gear box 102 by a scissors arrangement comprising arms 244 secured by a bracket 246 to the gear box 102 and by a universal connection 248 to the plate 240. The arms 228, sleeve 236 and the spherical bearing members 232 and 234 turn with the shaft 44. A scissors arrangement 250 is provided adjacent an arm 228 which is secured to a compression rod 252 (which rod provides a down stop 254 for the flapping link 180) and to a universal pivot 256 adjacent the arms 228 and arranged in a manner so as not to interfere with the oscillating action of the control rods 226.

Jackshafts 260, a pair of which are mounted diammetrically opposite fore and aft of the shaft 44, may be moved up and down differentially to cyclically change the pitch for fore and aft movements of the helicopter. A jackshaft 262 is arranged at the side of the shaft 44 and can be moved up and down together with the jackshafts 260 to change the total pitch of all the rotor blades, simultaneously, or moved separately to control the pitch cyclically for lateral movements of the helicopter. Upper universal pivot connections 263 (only one of which appears in Fig. 2) are in substantially the same plane as the universal pivots 227 of the push-pull rods 226 to provide precise control operation. Mechanism for raising and lowering the jackshafts 260 and 262 will be described more fully below.

With the blades 50 of this invention, the mass displacement is such that centrifugal forces acting upon the blades will create a force tending to reduce the pitch thereof, and thus cause a downward force on the jackshafts 260 and 262. Such force will attain a minimum value at substantially zero pitch, and a maximum at the highest possible pitch, with respect to the axis of rotation (the drive shaft 44) so long as this maximum angle does not exceed forty-five degrees. Normally, the rotor blades 50 operate between a minimum of about two degrees, and a maximum of about twenty degrees. The pitch reducing moment on each blade for such range may vary from substantially zero inch pounds at low pitch, to three hundred inch pounds at high pitch. Also, the different blades will exert cyclic forces as they are feathered. To balance such cyclic forces and compensate the total pitch reduction forces in the normal operating range for the blades 50, to reduce the operating forces required, mechanism for balancing forces between the several blades of the rotor and for compensating for such pitch reducing moments of the blades is provided which is shown generally at 264. A gimbal 266 (Fig. 3) is carried by a drive shaft extension 268, which extension also accommodates a hoisting ring 270 for lifting the helicopter. The gimbal 266 has arms 272 attached to its outer ring which connect by springs 274 to pivot mounting extensions 276 of the control arms 228. By such an arrangement, when one arm 228 is lowered and the others raised around the spherical segment 232, the arms 272 will be raised similarly. Thus, through the springs 274, which are normally in tension to compensate the pitch reducing moment mentioned above, the control force will be transferred through the parallelogram formed by the arms 228 and 272 and the springs 274 to equalize the control forces on all of the arms 228. Similarly, pitching forces acting on one arm in a cycle will have the force balanced in part by the parallel spring arrangement. If desired, the springs may be compression springs arranged with reversing linkage, and still perform the same function.

To further isolate vibration of the rotor head and to prevent these vibrations from being transferred in a substantial degree from the rotor head and control parts down to the manual control mechanism (to be described below) an improved jackshaft operator is provided which provides both total pitch and cyclic pitch changes, and is shown in some detail in Fig. 4. A bracket 280 may be secured to the gear housing 102 or other fixed parts of the craft, and connects to a housing 282 which supports by bearings 284 a rotatable internally threaded sleeve 286 which connects at its lower end with a sprocket 288. The jackshaft 260 (or 262) connects by a ball joint and radial and thrust bearing 290 with an externally threaded sleeve 292 that mates with the sleeve 286 and is internally splined to a shaft 287 which connects at its lower end to a sprocket 294 that is spaced by a bearing 296 from the sleeve 286. As the sprocket 288 is rotated with respect to the sprocket 294, the threads between sleeves 286 and 292 will cause the jackshaft 260 (or 262) to be raised or lowered. If one sprocket is turned an equal extent but oppositely to the turning of the other sprocket, the jackshaft will move vertically as a function of the summation of these movements determined by the screw pitch. If the sprockets turn the same amount in the same direction, the jackshaft will remain stationary.

In Fig. 5, the operating mechanism for the jackshafts 260 and 262 is shown diagrammatically along with the other controls for effecting manual control of the helicopter and including the control sticks 68 and total pitch arms 70. The pedals 66 control the tail rotor pitch by means of cables 300 and have no direct effect upon the control of the main rotor. When the total pitch arm 70 (only one of which is shown for purposes of clarity) is raised, a segment 302 is rotated in a clockwise direction to move a cable 304 toward the right to rotate a sprocket 306 in a clockwise direction and through a torque tube and additional sprocket 307 move a chain 308 in a clockwise direction to turn the several sprockets 288 in a direction simultaneously to raise the jackshafts 260 and 262 to thereby raise the whole control mechanism 230 and all of the control rods 226 to rotate all of the rotor blades 50 equally in a pitch increasing direction in the manner described above. As the control arm 70 is moved downwardly, the opposite rotations will obtain and a pitch decreasing motion will occur in the rotor blade control linkage.

When one or the other of the control sticks 68 is moved in the forward direction, for example, a quadrant 310 will be rotated in a clockwise direction, a cable 312 will be moved toward the right and a sprocket 314 will move in a counterclockwise direction to rotate a chain 316 by means of a torque tube and additional sprocket 317 generally in a counter-clockwise direction. The chain 316 leads through suitable idler sprockets and the lower actuating sprockets 294 to rotate the rear jackshaft 260 in a clockwise direction and the forward jackshaft 260 in a counter-clockwise direction which actions will differentially move the fore and aft parts of the tilt mechanism 230 to tilt it upward at the rearward part. Inasmuch as the blade control arms 222 (Fig. 3) lead the position of a blade 50 by substantially 90 degrees in the direction of rotation, the tilt mechanism will cause the highest pitch of the blade to occur when the blade is substantially at a right angle to the left of the craft looking toward the front and the minimum pitch to occur diammetrically opposite in its path of rotation. This will cause the tip path plane of the blades 50 to tilt upwardly at the rear of the ship and downwardly at the front of the ship to provide a forward lateral component of rotor thrust to obtain translation and directional control thereof. Such action is more fully pointed out and claimed in the U. S. Patent to I. I. Sikorsky, No. 2,517,509 of August 1, 1950, to which reference may be had.

As the control stick 68 is moved to the right or to the left side of the forward part of the helicopter, a quadrant 320 will be rotated to move cables 322 differentially to rotate a quadrant 324 to move a cable 326 and rotate a sprocket 328. The sprocket 328 turns a torque tube and additional sprocket 329 to turn a chain 330 connected with the lower sprocket 294 connected with the jackshaft 262 to tilt the mechanism 230 laterally of the craft to cause the tip path plane of the rotor blades to tilt in a direction corresponding to the tilt of the control stick 68.

While we have shown and described in particular detail the features of construction of one type of craft, obviously many modifications thereof will occur to those skilled in the art.

We claim:

1. In a helicopter having rotor blades mounted for universal movement in response to aerodynamic forces and to changes in the angle of incidence thereof, the combination of means for controlling the angle of incidence thereof cyclically and collectively comprising, universally tiltable and bodily movable means for controlling the angle of incidence, and manual control means including a plurality of jack screws, each having two relatively rotatable threaded mating parts, and sprocket and chain actuators for said parts, said manual control means having connections with said sprocket and chain actuators for rotating corresponding parts of all of said jack screws simultaneously to actuate said movable means bodily to change the pitch of said blades collectively and having other connections for rotating the mating parts of certain of said jack screws to tilt said movable means and change the pitch of said blades cyclically.

2. In a helicopter, a drive shaft, a rotor hub mounted on said drive shaft, a plurality of controllable pitch blades connected to said hub, means for changing the pitch of said blades both collectively and cyclically including a bodily movable and tiltable member, jack screws operatively connected to said member at points fore and aft and at one side of said drive shaft, each having concentric externally and internally threaded mating parts, a driving element carried by each part, means for moving said member bodily to collectively change the pitch of said blades including a manual member having an operative connection with the driving elements of like threaded parts of said jack screws, and means for tilting said tiltable member cyclically to change the pitch of said blades including manual means having operative connections with the driving elements of the other and mating parts of certain of said jack screws.

3. In a helicopter, a drive shaft, a rotor hub mounted on said drive shaft, a plurality of controllable pitch blades connected to said hub, means for changing the pitch of said blades both collectively and cyclically including a bodily movable and tiltable member, jack screws operatively connected to said member at points fore and aft and at one side of said drive shaft, each having inner and outer concentric relatively rotatable threaded mating parts, bearing means mounting the outermost of said parts rotatably on the body of the helicopter, driving wheels carried by both said inner and outer parts, operating means connecting the driving wheels of like parts of said jack screws including a manually operable element for moving said member bodily to collectively change the pitch of said blades, and operating means connecting the driving wheels on the other parts of certain of said jack screws including a manually operable element for tilting said member to change the pitch of said blades cyclically.

4. In a helicopter, a vertically disposed drive shaft, a rotor hub mounted on the upper end of said drive shaft, a plurality of controllable pitch blades connected to said hub, means for changing the pitch of said blades both collectively and cyclically including a member bodily movable axially of said shaft and tiltable about said shaft as an axis, jack screws operatively connected to said member fore and aft and at one side of said drive shaft, each including inner and outer concentric parts having mutually engaging threads, bearing means securing the outer part of each jack screw rotatably to the body of the helicopter, driving wheels carried by both said inner and outer parts for rotating each of the latter relative to the other, manually operative means including a total pitch control lever and a cyclic pitch control lever, operating means connecting said total pitch control lever with the wheels of corresponding parts of all of said jacks for rotating said corresponding parts relative to their mating parts to effect total pitch control, and operating means connecting said cyclic pitch control lever with the driving wheels of said mating parts of certain of said jack screws for rotating said mating parts relative to said corresponding parts to tilt said member to effect cyclic control.

5. In a helicopter, a vertically disposed drive shaft, a rotor hub mounted on the upper end of said drive shaft, a plurality of controllable pitch blades connected to said hub, means for changing the pitch of said blades both collectively and cyclically including a member bodily movable axially of said shaft and tiltable about said shaft as an axis, jack screws operatively connected to said member fore and aft and at one side of said drive shaft, each including inner and outer concentric parts having mutually engaging threads, bearing means securing the outer part of each jack screw rotatably to the body of the helicopter, driving wheels carried by said inner and outer parts for rotating each of the latter relative to the other, manually operative means including a total pitch control lever and a cyclic pitch control lever, operating means connecting said total pitch control lever with the wheels of corresponding parts of all of said jacks for rotating said corresponding parts relative to their mating parts to effect total pitch control, and operative means connecting the driving wheels of the mating parts of said screw jacks with said cyclic pitch control lever to effect tilting of said member, said latter connections being such as to rotate the wheels of said fore and aft jacks differentially and in opposite directions upon fore and aft movements of said cyclic pitch control lever and to rotate the wheel of the jack at one side of said drive shaft in opposite directions upon lateral movements of said lever.

6. In a helicopter, a drive shaft, a rotor hub mounted on said drive shaft, a plurality of controllable pitch blades connected to said hub, means for changing the pitch of said blades both collectively and cyclically including a bodily movable and tiltable member, a plurality of jack screws, each comprising inner and outer concentric parts having their proximate outer and inner surfaces provided with mating screw threads, means for supporting the outer parts of said jack screws rotatably on fixed structure of the helicopter, means for connecting the inner parts thereof to said member at points spaced laterally from said drive shaft, said jack screws being arranged relative to said shaft so that the inner parts thereof are connected to said member at points fore, aft and at one side of said shaft, driving means secured to the inner and outer parts respectively of the several jack screws, manually operable means having connections to the driving means on the outer parts of the several jack screws for rotating all of said outer parts simultaneously to move said member bodily and change the pitch of said blades collectively, and other connections between said manually operable means and the drive means on the inner parts of certain of said jack screws for rotating said inner parts of the selected jack screws to tilt said member and change the pitch of said blades cyclically.

IGOR I. SIKORSKY.
WILLIAM E. HUNT.
EDWARD F. KATZENBERGER.

REFERENCES CITED

The following references are of record in the file of this patent:

UNITED STATES PATENTS

| Number | Name | Date |
|---|---|---|
| D. 138,045 | Sikorsky | June 6, 1944 |
| 1,386,493 | Guyot | Aug. 2, 1921 |
| 1,599,955 | Dornier | Sept. 14, 1926 |
| 1,651,716 | Klemm | Dec. 6, 1927 |
| 1,776,877 | Yonkese | Sept. 30, 1930 |
| 1,938,091 | Wick | Dec. 5, 1933 |
| 2,002,944 | Hathorn | May 28, 1935 |
| 2,006,468 | Longren | July 2, 1935 |
| 2,067,228 | Bennett | Jan. 12, 1937 |
| 2,264,944 | Tidd | Dec. 2, 1941 |
| 2,297,400 | Friedrich | Sept. 29, 1942 |
| 2,318,260 | Sikorsky | May 4, 1943 |
| 2,383,038 | Bossi | Aug. 21, 1945 |
| 2,396,189 | Millar | Mar. 5, 1946 |
| 2,399,076 | Trice | Apr. 23, 1946 |
| 2,402,349 | Sikorsky | June 18, 1946 |
| 2,405,777 | Buivid | Aug. 13, 1946 |

FOREIGN PATENTS

| Number | Country | Date |
|---|---|---|
| 356,160 | Germany | July 14, 1922 |
| 155,974 | Switzerland | Oct. 1, 1932 |

OTHER REFERENCES

"Aviation," November 1944, page 127.